（12）United States Patent
Juds et al.

(10) Patent No.: US 9,857,244 B2
(45) Date of Patent: Jan. 2, 2018

(54) IN-CYLINDER PRESSURE MEASUREMENT UTILIZING A MAGNETO-ELASTIC ELEMENT FOR MEASURING A FORCE EXERTED ON AN ENGINE VALVE ASSEMBLY

(71) Applicant: Eaton Corporation, Cleveland, OH (US)

(72) Inventors: Mark Allan Juds, New Berlin, WI (US); John Albert Kovacich, Waukesha, WI (US)

(73) Assignee: Eaton Corporation, Cleveland, OH (US)

( * ) Notice: Subject to any disclaimer, the term of this patent is extended or adjusted under 35 U.S.C. 154(b) by 459 days.

(21) Appl. No.: 14/474,517

(22) Filed: Sep. 2, 2014

(65) Prior Publication Data

US 2015/0059455 A1   Mar. 5, 2015

Related U.S. Application Data

(60) Provisional application No. 61/873,609, filed on Sep. 4, 2013.

(51) Int. Cl.
  *G01L 1/12*  (2006.01)
  *G01L 5/00*  (2006.01)
  *G01L 9/00*  (2006.01)
  *G01L 23/14* (2006.01)

(52) U.S. Cl.
  CPC .............. *G01L 1/12* (2013.01); *G01L 5/0061* (2013.01); *G01L 9/0004* (2013.01); *G01L 23/14* (2013.01)

(58) Field of Classification Search
  CPC .......... G01L 1/125; G01L 3/102; G01L 1/122
  See application file for complete search history.

(56) References Cited

U.S. PATENT DOCUMENTS

| 4,416,161 | A | * | 11/1983 | Barkhoudarian | ....... G01L 3/102 |
| | | | | | 324/209 |
| 4,711,795 | A | * | 12/1987 | Takeuchi | ................ C23C 24/02 |
| | | | | | 427/127 |
| 5,386,733 | A | * | 2/1995 | Hesthamar | .............. G01L 3/102 |
| | | | | | 73/779 |
| 6,598,491 | B2 | | 7/2003 | Opie | |
| 6,698,299 | B2 | | 3/2004 | Cripe | |
| 6,701,793 | B2 | * | 3/2004 | Wallin | .................... G01L 3/102 |
| | | | | | 73/862.333 |
| 6,925,892 | B2 | | 8/2005 | Gandrud | |
| 7,409,878 | B2 | | 8/2008 | Von Beck | |
| 7,996,142 | B2 | | 8/2011 | Sihler | |
| 8,113,179 | B1 | | 2/2012 | Bright | |
| 8,738,249 | B2 | | 5/2014 | Fujii | |
| 8,738,254 | B2 | | 5/2014 | Lee | |
| 2009/0114040 | A1 | * | 5/2009 | Mizuno | ................... G01L 1/127 |
| | | | | | 73/862.69 |

* cited by examiner

*Primary Examiner* — Peter Macchiarolo
*Assistant Examiner* — Anthony W Megna Fuentes
(74) *Attorney, Agent, or Firm* — EMCK Law Group PLC

(57) ABSTRACT

A force sensor can include a magnetic field generator, a magnetic flux return, and a magneto-elastic layer. The magnetic flux return can extend along a first portion of at least one pathway of magnetic flux generated by the magnetic field generator. The magneto-elastic layer can be operable to be in contact with a surface subjected to force and thereby strained. The magneto-elastic layer can extend along a second portion of the at least one pathway of magnetic flux distinct from the first portion.

22 Claims, 9 Drawing Sheets

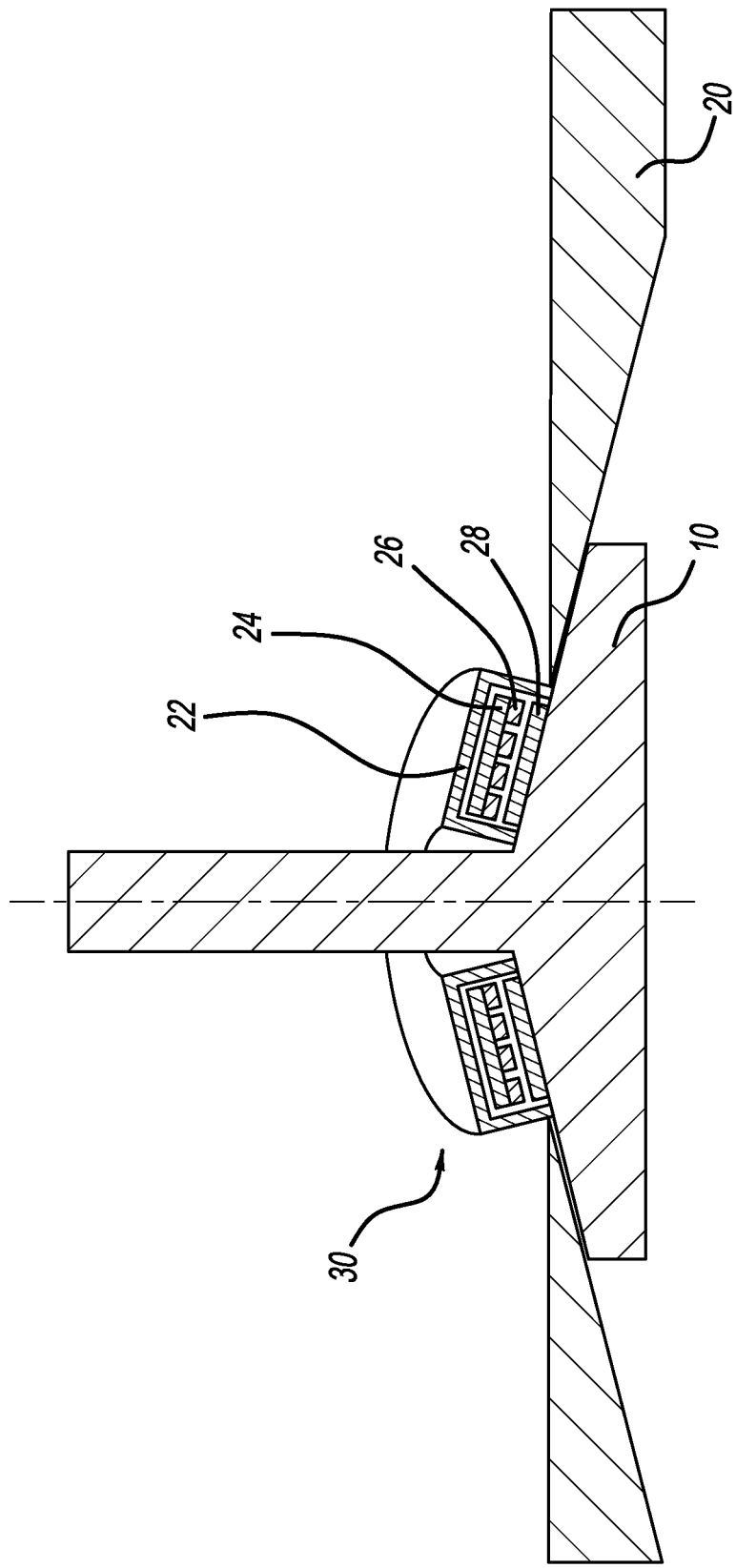

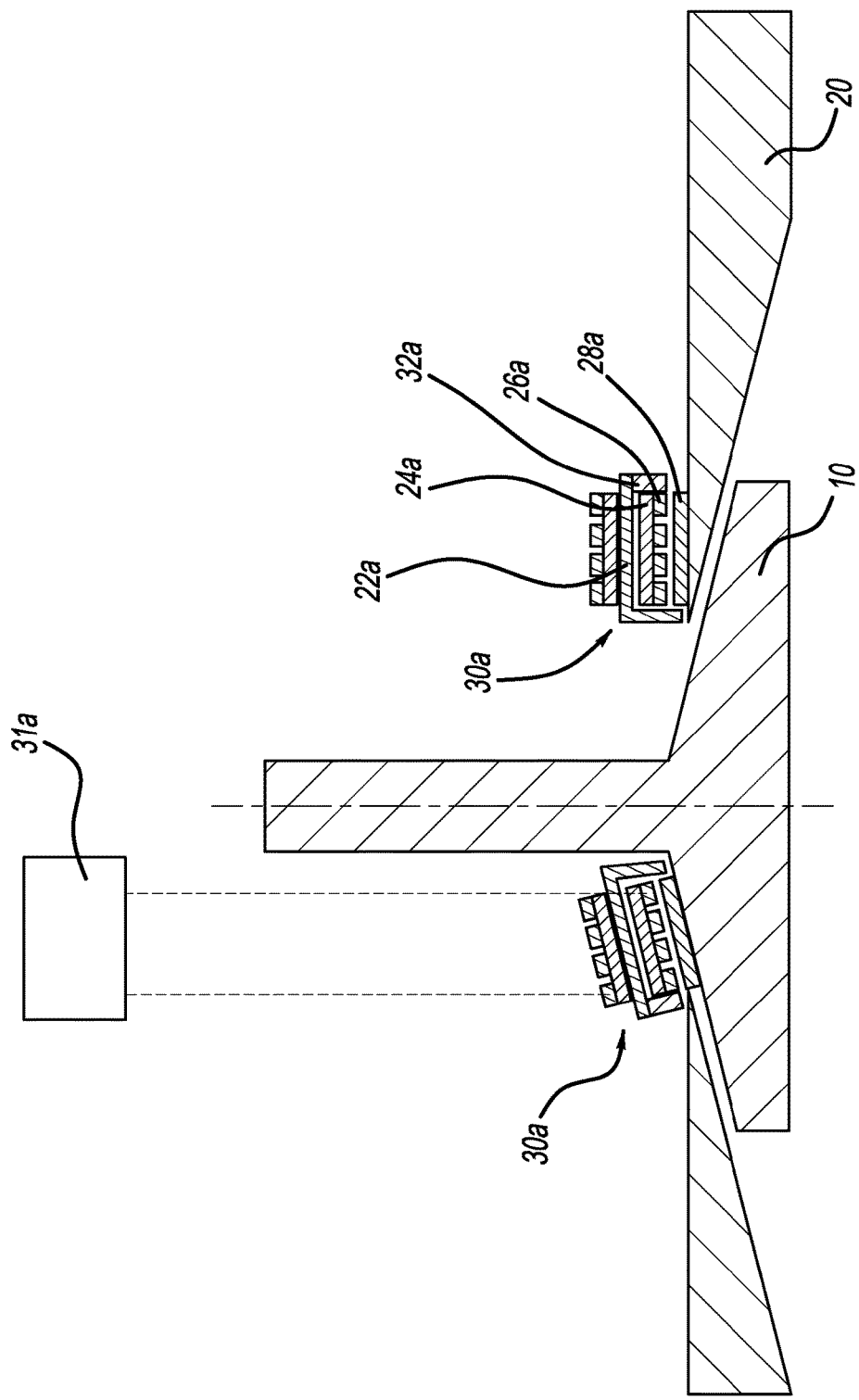

IN-CYLINDER PRESSURE MEASUREMENT UTILIZING A MAGNETO-ELASTIC ELEMENT FOR MEASURING A FORCE EXERTED ON AN ENGINE VALVE ASSEMBLY

CROSS-REFERENCE TO RELATED APPLICATIONS

This application claims the benefit of U.S. Provisional Patent Application Ser. No. 61/873,609, filed on Sep. 4, 2013. The disclosure of the above application is incorporated herein by reference in its entirety.

FIELD

The present disclosure relates generally to in-cylinder pressure measurement in an internal combustion engine, and more particularly to the use of a force transducer that includes a magneto-elastic element for measuring the force exerted on an engine valve assembly and correlating the measured force to the in-cylinder pressure.

BACKGROUND

There is demand in the automotive industry for pressure sensors that can be operated in combustion engines to determine pressure and/or temperature in a combustion chamber. By accurately monitoring and controlling the pressure and temperature in the combustion chamber, engine efficiency can be raised and the fuel consumption and the pollutant emissions reduced. A low cost non-obtrusive pressure sensor installed inside the engine cylinder could measure the combustion pressure and output that data as a waveform signal. Through the analysis thereof, with appropriate packaging, circuitry, and data algorithms, it would be possible to monitor the knocking and misfire and thus to control the variable valve timing, minimum timing for best torque, lean burn, etc.

The background description provided herein is for the purpose of generally presenting the context of the disclosure. Work of the presently named Inventors, to the extent it is described in this background section, as well as aspects of the description that may not otherwise qualify as prior art at the time of filing, are neither expressly nor impliedly admitted as prior art against the present disclosure.

SUMMARY

A force sensor can include a magnetic field generator, a magnetic flux return, and a magneto-elastic layer. The magnetic flux return can extend along a first portion of at least one pathway of magnetic flux generated by the magnetic field generator. The magneto-elastic layer can be operable to be in contact with a surface subjected to force and thereby strained. The magneto-elastic layer can extend along a second portion of the at least one pathway of magnetic flux distinct from the first portion.

According to additional features, the magnetic field generator can be further defined as a coil encircling at least part of the at least one pathway. An AC source can be disposed to drive the coil. The AC source can be operable to detect a change in an induction across the coil. Alternatively, a DC source can be disposed to drive the coil. A magnetic sensor can be disposed along the at least one pathway spaced from the coil.

According to other features, the magnetic field generator can be further defined as a permanent magnet. The permanent magnet can be disposed along the at least one pathway. A passive coil can be disposed along the at least one pathway spaced from the permanent magnet.

In other features, the magnetic field generator can be further defined as an excitation coil. The magnetic flux return can be further defined as first and second ends of a first core that is encircled by a receiving coil. The excitation coil can be operable to produce a magnetic flux that leaves a first end of a second core encircled by the excitation coil and travels through the magneto-elastic layer to a second end of the second core. The magnetic flux can pass through the first and second ends of the first core. A difference in magnetic flux at the first and second ends of the second core can result in a magnetic flux in the receiving coil.

According to additional features, the magnetic field generator and the magnetic flux return can be arranged such that the at least one pathway includes first and second pathways. The magneto-elastic layer can be disposed along one of the first and second pathways. The magneto-elastic layer can be disposed along the first pathway and an air gap can be defined along the second pathway. A magnetic sensor can be positioned in the air gap. Alternatively, a passive coil can encircle the air gap.

An apparatus for measuring pressure within a cylinder of an internal combustion engine can include an engine valve assembly and at least one force sensor. The engine valve assembly can have a valve with a valve head and a valve stem extending from the valve head in an axial direction. The valve head can have a valve face configured to be in pressure communication with a combustion chamber of the internal combustion engine. The valve stem can be configured to extend through an opening in a valve seat secured to an engine block of the internal combustion engine. The at least one force sensor can be installed in the internal combustion engine on one of the valve head and the valve seat and configured to detect strain resulting from pressure within the engine cylinder. The at least one force sensor can include a magneto-elastic layer in contact with the one of the valve head and the valve seat.

According to other features, the at least one force sensor can be ring-shaped. The at least one force sensor can abut the valve seat and can be spaced from the valve head. The at least one force sensor can be mounted on the valve head. The at least one force sensor can include a plurality of sensors, including a first sensor mounted on the valve head and a second sensor positioned on the valve seat.

A method for measuring pressure within a cylinder of an internal combustion engine can include applying a layer of magneto-elastic material on one of a valve head and valve seat positioned at a combustion chamber of an internal combustion engine. The method can also include generating a magnetic field such that magnetic flux from the magnetic field travels along a path passing through the layer of magneto-elastic material. The method can also include detecting a change in a level of the magnetic flux. The method can also include correlating the detected change in the level of the magnetic flux to a level of pressure in the combustion chamber of the internal combustion engine.

In other features, detecting can include directly detecting a change in a level of magnetic flux with a sensor positioned along the path. Alternatively, detecting can include indirectly detecting a change in a level of magnetic flux with a coil encircling a portion of the path.

BRIEF DESCRIPTION OF THE DRAWINGS

The present disclosure will become more fully understood from the detailed description and the accompanying drawings, wherein:

FIG. 2 is a schematic illustration of another system for measuring pressure within a combustion chamber constructed according to an embodiment of the present disclosure;

FIG. 4 is a schematic illustration of another system for measuring pressure within a combustion chamber constructed according to an embodiment of the present disclosure;

DETAILED DESCRIPTION

It is desirable to incorporate a low cost sensor/transducer into the engine valvetrain system in order to determine pressure and/or temperature in a combustion chamber. This disclosure proposes a method and system to measure the deflection of a portion of an engine valve system. The deflection can be calibrated to engine combustion pressure so that the engine valve system is able to measure cylinder pressure and/or temperature in real time.

This disclosure relates to a method of monitoring the displacement of an engine valve during a combustion pressure event, the pressure within an engine cylinder applied to a contact mechanism contained within the valvetrain. The displacement can be assessed to monitor and measure stress and/or strain as a function (transfer function) of the combustion pressure and/or temperature. Such a system can provide improved fidelity over alternative methods and systems.

The present disclosure provides a low cost combustion pressure sensor for an internal combustion engine using an embedded force transducer having positive contact with a feature on the valvetrain, e.g., a valve and/or a valve seat. The measurement from the force transducer can be correlated to the force exerted on the associated valvetrain feature, which can then be correlated to the pressure and/or temperature in the combustion chamber of the internal combustion engine.

Figure 1:
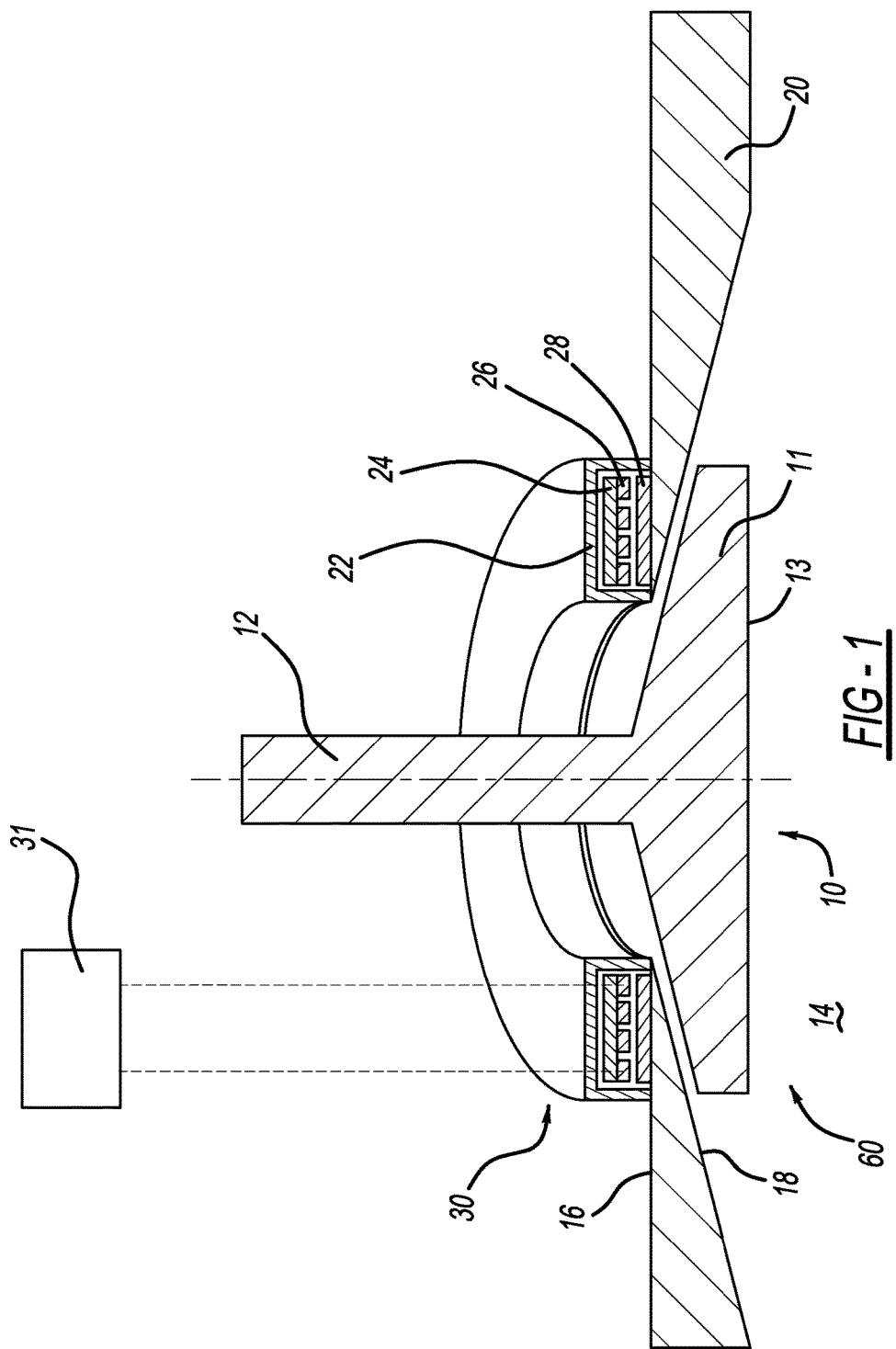
FIG. 1 is a schematic illustration of a system for measuring pressure within a combustion chamber constructed according to an embodiment of the present disclosure.

Referring now to FIG. 1, an example in-cylinder pressure measurement system that is installed in an internal combustion engine according to some embodiments of the present disclosure is illustrated. The engine can define a combustion chamber 14 in which an engine valve assembly 60 is arranged. The engine valve assembly 60 can include a valve 10 and a valve seat 20. The valve 10 can be selectively actuated between an open and closed position, e.g., through operation of a camshaft and rocker arm assembly (not shown). When in the closed position, a valve head 11 of the valve 10 is in contact with the valve seat 20. A valve stem 12 of the valve 10 extends from the valve head 11 in an axial direction and passes through an opening defined by the valve seat 20. A valve face 13 of the valve head 10 is positioned in pressure communication with the combustion chamber 14. The valve seat 20 can be secured to an engine block of the internal combustion engine. A force transducer or sensor 30 can be arranged in contact with the valve seat 20 to measure the force exerted upon the valve seat 20 by the valve 10 during the combustion cycle. The level of force exerted on the valve seat can result in an amount of strain in the valve seat 20 detectable by the force sensor 30.

As shown in FIG. 1, the force sensor 30 can be ring-shaped and located on the circumference of the valve seat 20 and be arranged to be in contact with a surface 16 of the valve seat 20 opposite the surface 18 the valve 10 contacts. In the illustrated embodiment, the force sensor 30 can include a magnetic flux return 22, a bobbin 24, a coil 26, and a magneto-elastic layer 28. The magnetic flux return 22 can be made of a soft magnetic material (such as low carbon steel). Alternatively, the magnetic flux return 22 can be omitted from the force sensor 30. The bobbin 24 can be made of a non-magnetic material such as molded plastic, or can be a printed circuit board. The coil 26 can be a magnet wire wound in a spiral pattern onto a surface of the bobbin 24, or can be a printed copper winding on the printed circuit board. The exemplary coil 26 is a magnetic field generator encircling a portion of a pathway of magnetic flux. The magnetic flux return 22 can also extend along the pathway for magnetic flux generated by the coil 26. The force sensor 30 can also include AC source 31 disposed to drive the coil 26. The AC source 31 can be operable to detect a change in an induction across the coil 26.

The magneto-elastic layer 28 can be a bonded (glued, brazed, welded, etc.) or deposited (such as by vapor deposition or spray coating) film on the valve seat 20, spaced from the valve head 11. The magneto-elastic layer 28 also extends along the pathway of magnetic flux. The magnetic flux return 22 and the magneto-elastic layer 28 can thus define distinct portions of the pathway of magnetic flux. The force sensor 30 can detect changes in the inductance in the coil 26 caused by changes in the magnetic permeability of the magneto-elastic layer 28 arising from the force applied against the valve seat 20. A change in the magnetic permeability results in a change in a level of magnetic flux. A change in the level of magnetic flux can thus be correlated to a level of pressure in the combustion chamber 14.

Referring now to FIG. 2, another example of an in-cylinder pressure measurement system that can be installed in an internal combustion engine according to some embodiments of the present disclosure is illustrated. In this example, the force sensor 30 is mounted on the circumference of the valve head 11. The force sensor 30 can include a magnetic flux return 22, a bobbin 24, a coil 26 and a magneto-elastic layer 28. The magnetic flux return 22 can be made of a soft magnetic material (such as low carbon steel). Alternatively, the magnetic flux return 22 can be omitted from the force sensor 30. The bobbin 24 can be made of a non-magnetic material such as molded plastic, or can be a printed circuit board. The coil 26 can be magnet wire wound onto the bobbin 24, or can be a printed copper winding on the printed circuit board. The magneto-elastic layer 28 can be a bonded (glued, brazed, welded, etc.) or deposited (such as by vapor deposition or spray coating) film. The force sensor 30 can detect changes in the inductance in the coil 26 caused by changes in the magnetic permeability of the magneto-elastic layer 28.

Figure 3A:
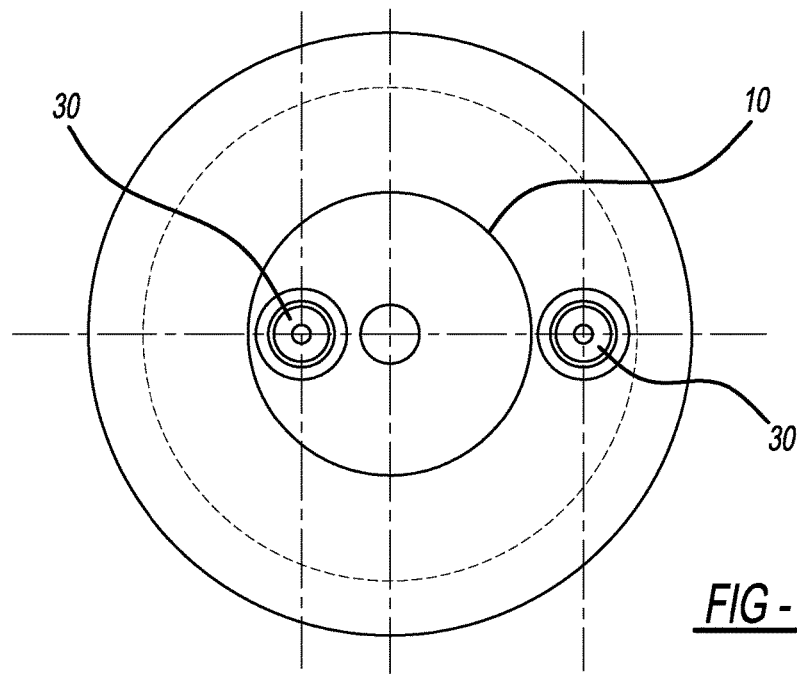
FIG. 3A is a schematic illustration of another system for measuring pressure within a combustion chamber constructed according to an embodiment of the present disclosure.
Figure 3B:
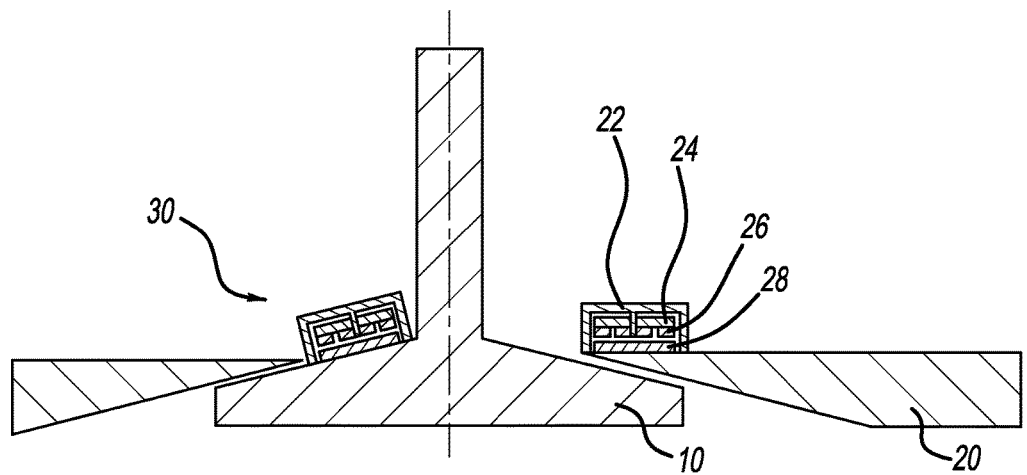
FIG. 3B is a top view of the system shown in FIG. 3A.

Referring now to FIGS. 3A and 3B, another example in-cylinder pressure measurement system that is installed in an internal combustion engine according to some embodiments of the present disclosure is illustrated. Rather than being a circumferential element, the force sensor 30 is shown as one or more "spot" elements that are arranged on either or both of the valve 10 or valve seat 20. Each spot element is a distinct force sensor. Although the force sensor 30 is shown in FIG. 3B as circular in shape, it should be appreciated that the force transducer(s) 30 can have any acceptable shape. Similar to the configurations of FIGS. 1 and 2, the force sensor 30 can include a magnetic flux return 22, a bobbin 24, a coil 26 and a magneto-elastic layer 28. The magnetic flux return 22 can be made of a soft magnetic material (such as low carbon steel). Alternatively, the magnetic flux return 22 can be omitted from the force sensor 30. The bobbin 24 can be made of a non-magnetic material such as molded plastic, or can be a printed circuit board. The coil 26 can be magnet wire wound onto the bobbin 24, or can be a printed copper winding on the printed circuit board. The magneto-elastic layer 28 can be a bonded (glued, brazed, welded, etc.) or deposited (such as by vapor deposition or spray coating) film. The force sensor 30 can detect changes in the inductance in the coil 26 caused by changes in the magnetic permeability of the magneto-elastic layer 28.

In some embodiments of the present disclosure, and as illustrated in FIG. 4, a force sensor 30a can include a magnetic flux return 22a, a bobbin 24a, a coil 26a, a magneto-elastic layer 28a, and a magnetic sensor 32a. The force sensor 30a can also include DC source 31a disposed to drive the coil 26a. The magnetic flux return 22a can be made of a soft magnetic material (such as low carbon steel). Alternatively, the magnetic flux return 22a can be omitted from the force sensor 30. The bobbin 24a can be made of a non-magnetic material such as molded plastic, or can be a printed circuit board. The coil 26a can be magnet wire wound onto the bobbin 24a, or can be a printed copper winding on the printed circuit board. The magneto-elastic layer 28a can be a bonded (glued, brazed, welded, etc.) or deposited (such as by vapor deposition or spray coating) film. The magnetic sensor 32a can be, e.g., a Hall-effect sensor, a flux gate sensor, or a magneto-resistance sensor and can be disposed along the pathway for magnetic flux, spaced from the coil 26a. The coil 26a can be energized to produce a magnetic field that is modified by a change in the magnetic permeability of the magneto-elastic layer 28a. The force sensor 30a can operate by detecting changes in the magnetic field, which can be detected by the magnetic sensor 32a.

Figure 5:
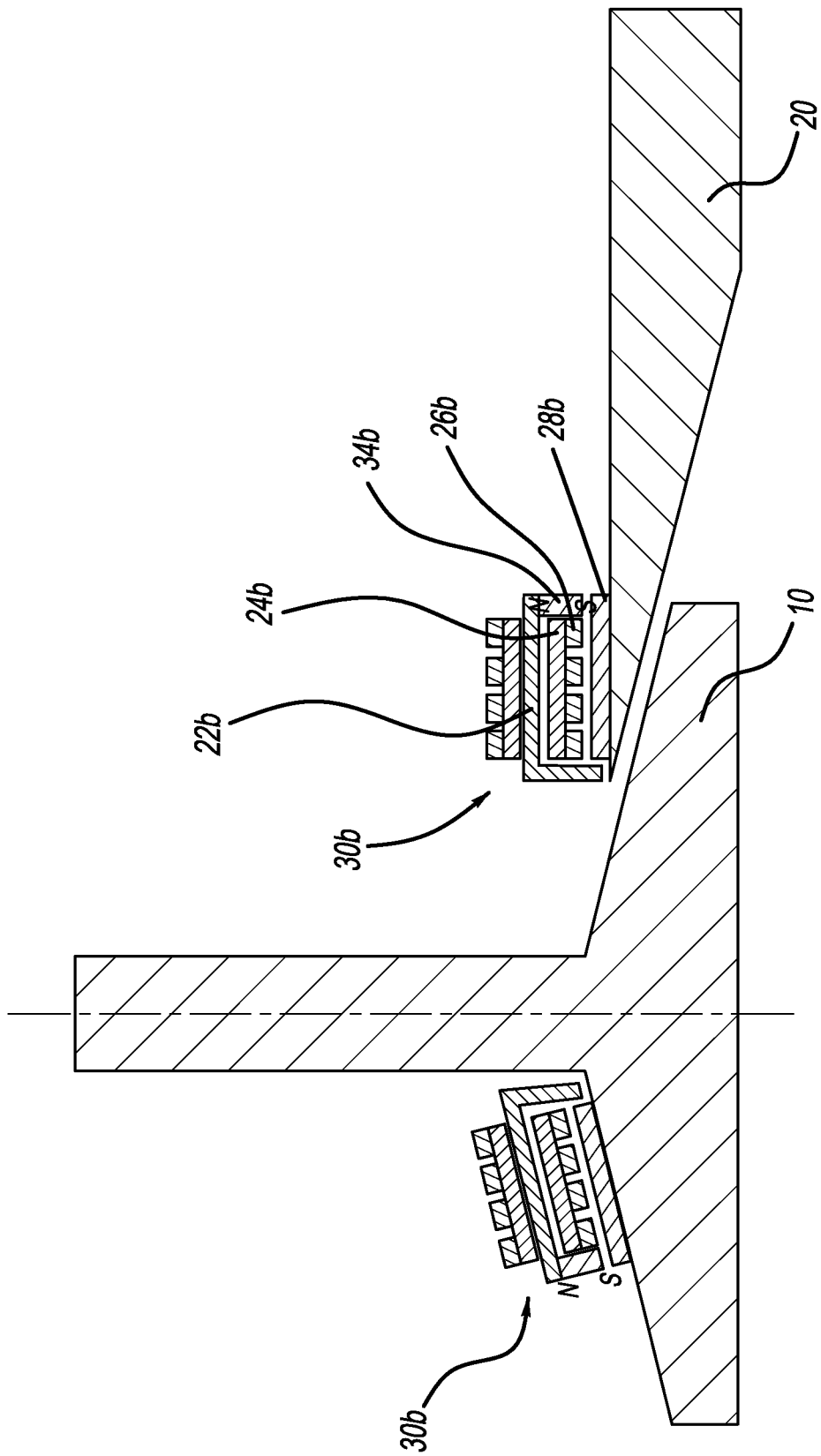
FIG. 5 is a schematic illustration of another system for measuring pressure within a combustion chamber constructed according to an embodiment of the present disclosure.

Referring now to FIG. 5, a force sensor 30b can include a magnetic flux return 22b, a bobbin 24b, a coil 26b, a magneto-elastic layer 28b, and a permanent magnet 34b. The magnetic flux return 22b can be made of a soft magnetic material (such as low carbon steel). Alternatively, the magnetic flux return 22b can be omitted from the force sensor 30b. The bobbin 24b can be made of a non-magnetic material such as molded plastic, or can be a printed circuit board. The coil 26b can be magnet wire wound onto the bobbin 24b, or can be a printed copper winding on the printed circuit board. The magneto-elastic layer 28b can be a bonded (glued, brazed, welded, etc.) or deposited (such as by vapor deposition or spray coating) film. The permanent magnet 34b is a magnetic field generator and is disposed along the pathway of the magnet flux. The coil 26b can be a passive coil and can be disposed along the pathway of magnetic flux, spaced from the permanent magnet 34b. The force sensor 30b of FIG. 5 can operate by measuring the voltage of the coil 26b, which can output a voltage pulse resulting from the rate of change of magnetic flux caused by changes in the magnetic permeability of the magneto-elastic layer 28b.

Figure 6:
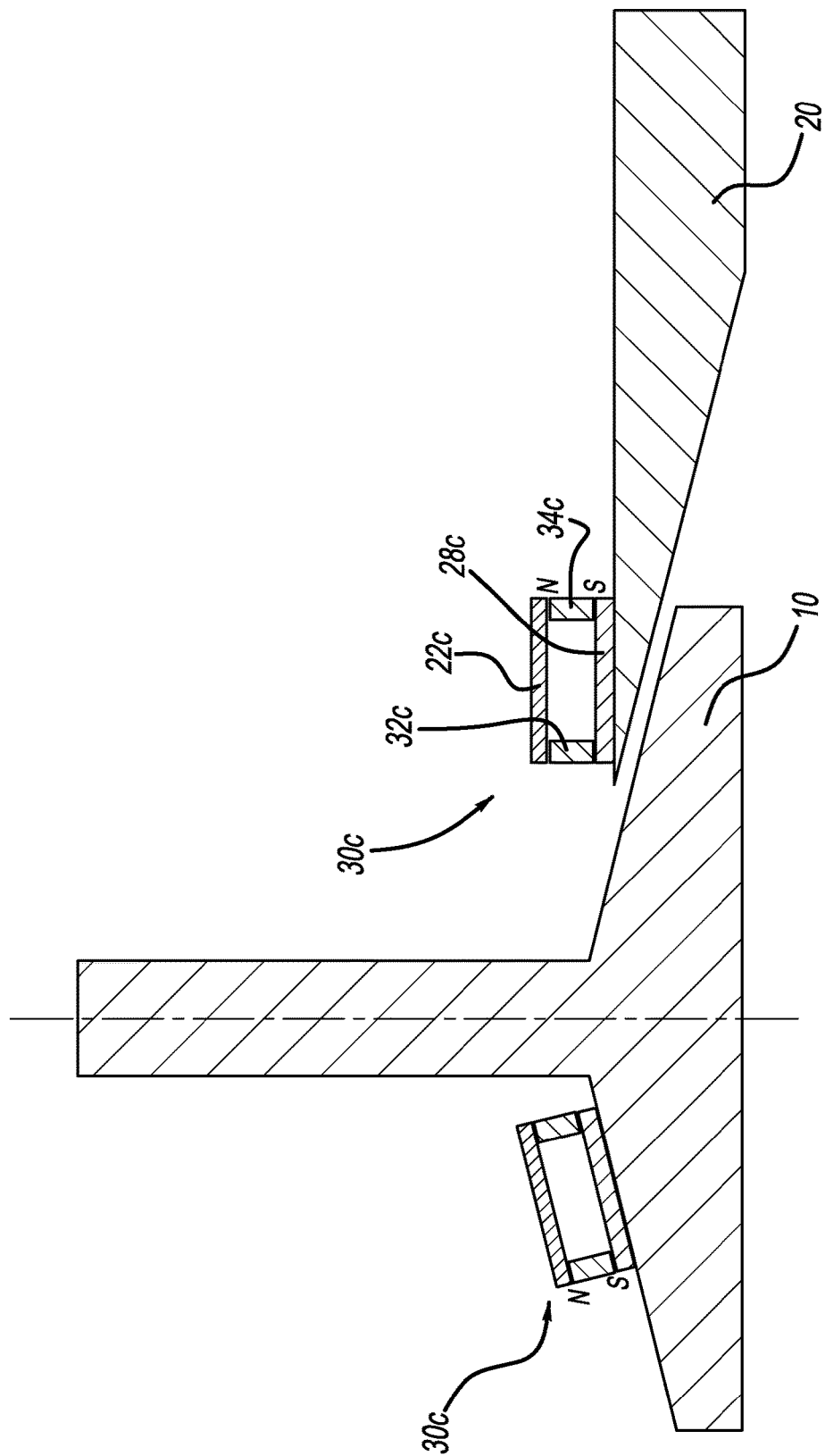
FIG. 6 is a schematic illustration of another system for measuring pressure within a combustion chamber constructed according to an embodiment of the present disclosure.

Referring now to FIG. 6, a force sensor 30c can include a magnetic flux return 22c, a magneto-elastic layer 28c, and a magnetic sensor 32c. The magnetic flux return 22c can be made of a soft magnetic material (such as low carbon steel). Alternatively, the magnetic flux return 22c can be omitted from the force sensor 30c. The magneto-elastic layer 28c can be a bonded (glued, brazed, welded, etc.) or deposited (such as by vapor deposition or spray coating) film. The magnetic sensor 32c can be, e.g., a Hall-effect sensor, a flux gate sensor, or a magneto-resistance sensor. The illustrated magnetic sensor 32c is disposed along the pathway of magnetic flux, spaced from the permanent magnet 34c. The permanent magnet 34c produces a magnetic field, which is modified by a change in the magnetic permeability of the magneto-elastic layer 28c. The force sensor 30c operates by detecting changes in the magnetic field, which can be detected by the magnetic sensor 32c.

Figure 7:
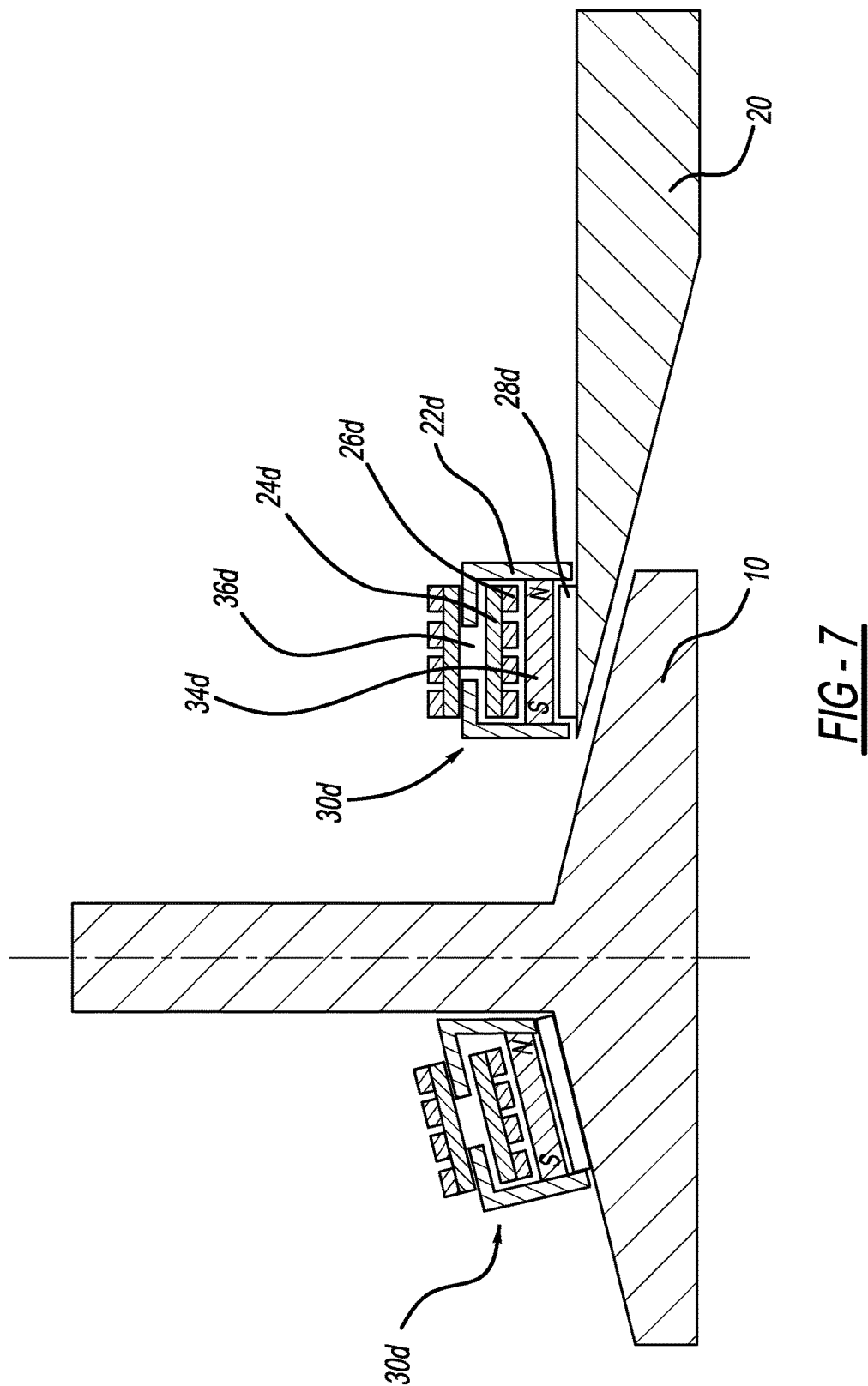
FIG. 7 is a schematic illustration of another system for measuring pressure within a combustion chamber constructed according to an embodiment of the present disclosure.

Referring now to FIG. 7, a force sensor 30d can include a magnetic flux return 22d, a bobbin 24d, a coil 26d, a magneto-elastic layer 28d, a permanent magnet 34d, and a balancing air gap 36d. The magnetic flux return 22d can be made of a soft magnetic material (such as low carbon steel). Alternatively, the magnetic flux return 22d can be omitted from the force sensor 30d. The bobbin 24d can be made of a non-magnetic material such as molded plastic, or can be a printed circuit board. The coil 26d can be magnet wire wound onto the bobbin 24d, or can be a printed copper winding on the printed circuit board. The magneto-elastic layer 28d can be a bonded (glued, brazed, welded, etc.) or deposited (such as by vapor deposition or spray coating) film. The permanent magnet 34d is a magnetic field generator. The permanent magnet 34d and the magnetic flux return 22d are arranged such that the magnetic flux can travels along first and second pathways, such as "top" and "bottom" pathways based on the orientation of FIG. 7. The magneto-elastic layer 28d is disposed along a first or bottom pathway and the air gap 36d is defined along the second or top pathway. The coil 26d encircles the air gap 36d. The force sensor 30d of FIG. 7 can operate by measuring the voltage of the coil 26d, which can output a voltage pulse resulting from the rate of change of magnetic flux caused by changes in the magnetic permeability of the magneto-elastic layer 28d.

Figure 8:
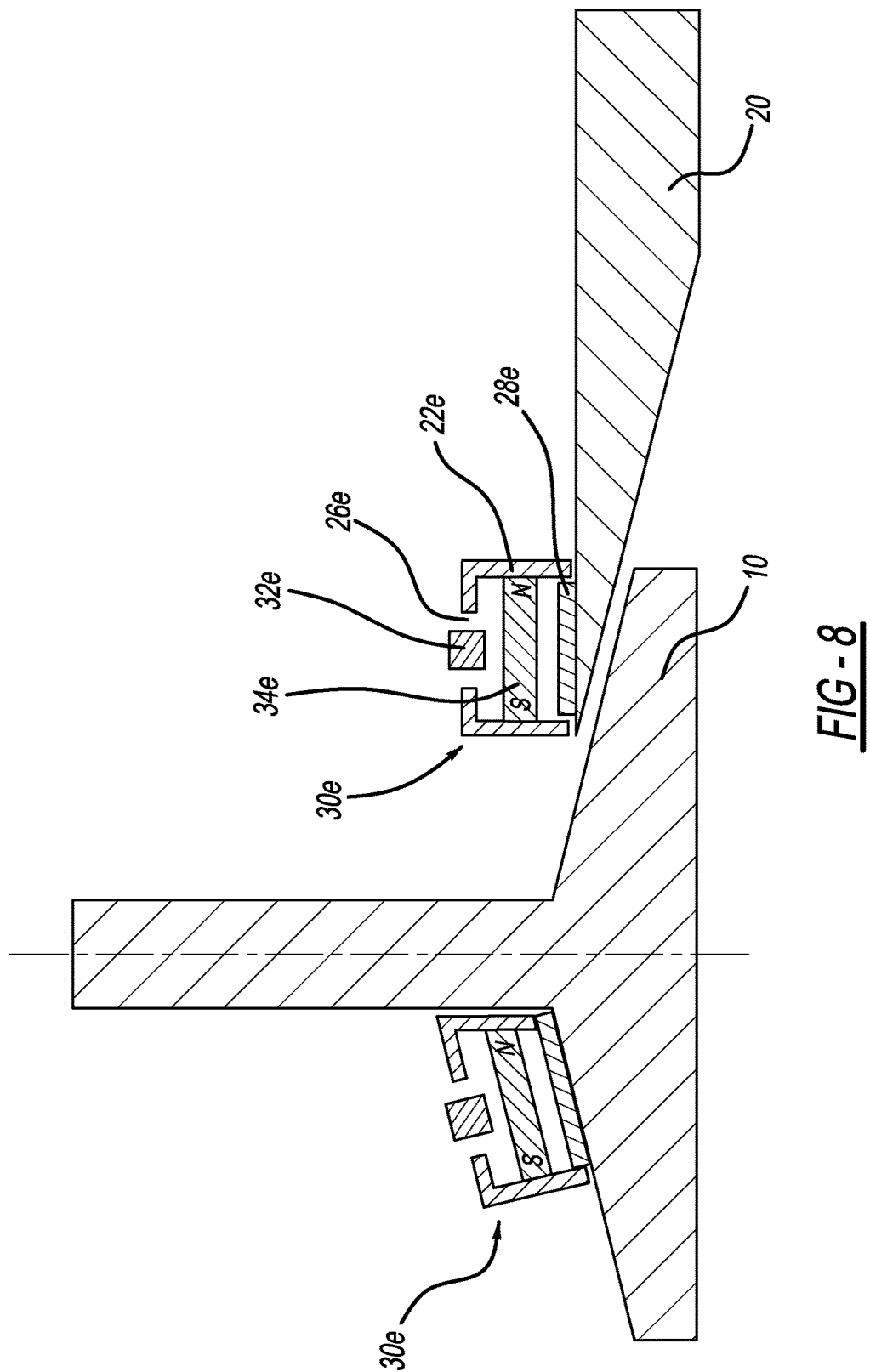
FIG. 8 is a schematic illustration of another system for measuring pressure within a combustion chamber constructed according to an embodiment of the present disclosure.

Referring now to FIG. 8, a force sensor 30e can include a magnetic flux return 22e, a magnetic sensor 32e, a magneto-elastic layer 28e, a permanent magnet 34e, and a balancing air gap 36e. The magnetic flux return 22e can be made of a soft magnetic material (such as low carbon steel). Alternatively, the magnetic flux return 22e can be omitted from the force sensor 30e. The magneto-elastic layer 28e can be a bonded (glued, brazed, welded, etc.) or deposited (such as by vapor deposition or spray coating) film. The magnetic sensor 32e can be, e.g., a Hall-effect sensor, a flux gate sensor, or a magneto-resistance sensor, that is located in the balancing air gap 36e. The permanent magnet 34e produces a magnetic field, which is modified by a change in the magnetic permeability of the magneto-elastic layer 28e. The permanent magnet 34e is a magnetic field generator. The permanent magnet 34e and the magnetic flux return 22e are arranged such that the magnetic flux can travels along first and second pathways, such as "top" and "bottom" pathways based on the orientation of FIG. 7. The magneto-elastic layer 28e is disposed along a first or bottom pathway and the air gap 36e is defined along the second or top pathway. The magnetic sensor 32e can be positioned in the air gap 36e. The force sensor 30e operates by detecting changes in the magnetic field, which can be detected by the magnetic sensor 32e.

Figures 9A, 9B:
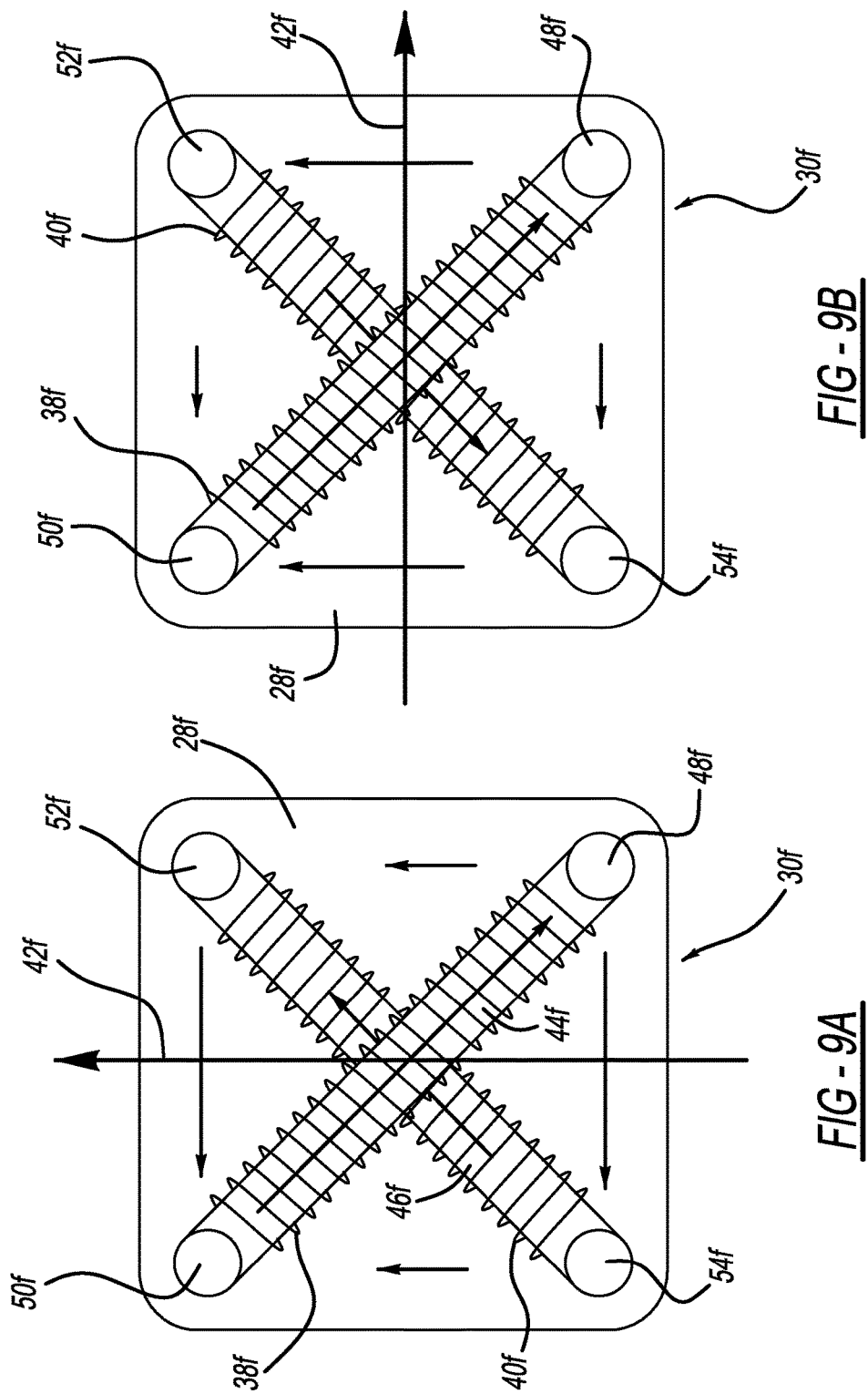
FIGS. 9A and 9B are schematic illustrations of an example apparatus for measuring the strain/force exerted on a valve that can be utilized in any of the illustrated apparatuses for measuring pressure of a combustion chamber as well as other embodiments of the present disclosure.

Referring now to FIGS. 9A and 9B, another example of an in-cylinder pressure measurement system that can be installed in an internal combustion engine according to some embodiments of the present disclosure is illustrated. The system of FIG. 9 is similar to the systems of FIGS. 1-8 described above, but instead utilizes an alternative apparatus for measuring the strain/force exerted on the force sensor 30f. In the illustrated example, the magnetic permeability of a magneto-elastic layer 28f can be measured as the ratio between the permeability parallel to and transverse to the principal strain. This can be measured by an Alternating Current (AC) excitation coil 38f and a receiving coil 40f. The excitation coil 38f is a magnetic field generator. The coil 38f can be positioned at an angle of approximately ninety degrees relative to the coil 40f. Each of the coils 38f, 40f can be positioned at an angle of approximately forty-five degrees relative to the expected principal strain direction, referenced at 42f in FIGS. 9A and 9B. Each of the coils 38f, 40f can respectively be wound onto a core, such as cores 44f and 46f, of high magnetic permeability materials (such as permalloy). Alternatively, multi-layer printed circuit board techniques could be utilized, in which the coil windings are printed copper traces on separate layers of the circuit board and the core material is a printed thin film layer on additional, separate layers.

In the illustrated examples, coil 38f can produce a magnetic flux that leaves an end 48f of the core 44f and travels through the magneto-elastic layer 28f to an end 50f of the core 44f via both ends 52f and 54f of core 46f. The magnetic flux is shown by unnumbered arrows. The difference in magnetic flux at ends 52f and 54f results in a magnetic flux in coil 40f. The flux in coil 40f is proportional to the difference in magnetic permeability of the magneto-elastic layer 28f in the directions parallel to and transverse to the principal strain. The AC voltage produced by the coil 40f is proportional to the flux in coil 40f, which is proportional to the strain and the engine cylinder pressure/temperature. The apparatus illustrated in FIG. 9 can be utilized, mutatis mutandis, in any of the systems illustrated in FIGS. 1-8 described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for measuring pressure within a cylinder of an internal combustion engine, comprising:
   an engine valve assembly having a valve for reciprocating in a combustion chamber of the internal combustion engine, the valve having a valve head and a valve stem, the valve head having a valve face configured to be in pressure communication with a valve seat of the combustion chamber; and
   a force sensor comprising:
      a magnetic field generator;
         a magnetic flux return extending along a first portion of at least one pathway of magnetic flux generated by the magnetic field generator; and
         a magneto-elastic layer operable to be in contact with a surface of the engine valve assembly subjected to force and thereby strained, the magneto-elastic layer extending along a second portion of the at least one pathway of magnetic flux distinct from the first portion, wherein the magneto-elastic layer is configured to be disposed on at least one of the valve head and the valve seat.

2. The apparatus of claim 1 wherein the magnetic field generator is further defined as a coil encircling at least part of the at least one pathway.

3. The apparatus of claim 2 further comprising:
   an AC source disposed to drive the coil, wherein the AC source is operable to detect a change in an induction across the coil.

4. The apparatus of claim 2 further comprising:
   a DC source disposed to drive the coil.

5. The apparatus of claim 4 further comprising:
   a magnetic sensor disposed along the at least one pathway spaced from the coil, wherein a DC source is disposed to drive the coil.

6. The apparatus of claim 1 wherein the magnetic field generator is further defined as an excitation coil and the magnetic flux return is further defined as first and second ends of a first core, the first core encircled by a receiving coil, wherein the excitation coil is operable to produce a magnetic flux that leaves a first end of a second core encircled by the excitation coil and travels through the magneto-elastic layer to a second end of the second core by passing through the first and second ends of the first core and wherein a difference in magnetic flux at the first and second ends of the first core results in a magnetic flux in the receiving coil,
   wherein the excitation coil and the receiving coil are positioned at an angle of approximately 45° relative to an expected principal strain direction, and the excitation coil is positioned at an angle of approximately 90° relative to the receiving coil.

7. The apparatus of claim 1 wherein the magnetic field generator and the magnetic flux return are arranged such that the at least one pathway includes first and second pathways, the magneto-elastic layer disposed along one of the first and second pathways.

8. The apparatus of claim 7 wherein the magneto-elastic layer is disposed along the first pathway and an air gap is defined along the second pathway.

9. The apparatus of claim 8 further comprising:
   a magnetic sensor positioned in the air gap.

10. The apparatus of claim 8 further comprising:
    a passive coil encircling the air gap.

11. The apparatus of claim 1, wherein the magneto-elastic layer is disposed on the valve head circumferentially about the valve stem.

12. The apparatus of claim 1, wherein the magneto-elastic layer comprises a first magneto-elastic layer disposed on the valve head, and a second magneto-elastic layer disposed on the valve seat.

13. The apparatus of claim 1, wherein the magnetic field generator is a coil and the coil is the only coil on the force sensor.

14. The apparatus of claim 1, further comprising a bobbin, wherein the magnetic field generator is a coil wound on the bobbin.

15. The apparatus of claim 5, wherein the magnetic force sensor is a Hall-effect sensor.

16. The apparatus of claim 5, wherein the magnetic force sensor is a flux gate sensor.

17. The apparatus of claim 1, further comprising:
a magnetic sensor disposed at a first edge of both the magneto-elastic layer and the magnetic flux return;
wherein the magnetic field generator is further defined as a permanent magnet disposed along the at least one pathway at a second edge of both the magneto-elastic layer and the magnetic flux return that is opposite the first edge and the magnetic sensor,
wherein the permanent magnet has a first pole facing the magneto-elastic layer and a second pole facing the magnetic flux return.

18. The apparatus of claim 1, further comprising:
a bobbin disposed at least partially about the magnetic flux return;
a passive coil disposed about the bobbin and along the pathway of the magnetic flux;
wherein the magnetic field generator is further defined as a permanent magnet extending between opposed first and second sides of the magnetic flux return, the permanent magnet having a first pole facing the first side of the magnetic flux return and a second pole facing the second side of the magnetic flux return,
wherein the permanent magnet is disposed between the magneto-elastic layer and the passive coil, and
wherein an air gap is defined between the first and second sides of the magnetic flux return and between opposed portions of the bobbin.

19. The apparatus of claim 1, further comprising a magnetic sensor disposed in a balancing air gap defined between opposed first and second sides of the magnetic flux return,
wherein the magnetic field generator is further defined as a permanent magnet extending between opposed first and second sides of the magnetic flux return, the permanent magnet having a first pole facing the first side of the magnetic flux return and a second pole facing the second side of the magnetic flux return, and
wherein the permanent magnet is disposed between the magneto-elastic layer and the magnetic sensor.

20. A force sensor comprising:
a magnetic field generator;
a magnetic flux return extending along a first portion of at least one pathway of magnetic flux generated by the magnetic field generator;
a magneto-elastic layer operable to be in contact with a surface of a combustion engine valve assembly subjected to force and thereby strained, the magneto-elastic layer extending along a second portion of the at least one pathway of magnetic flux distinct from the first portion; and
a magnetic sensor disposed at a first edge of both the magneto-elastic layer and the magnetic flux return,
wherein the magnetic field generator is further defined as a permanent magnet disposed along the at least one pathway at a second edge of both the magneto-elastic layer and the magnetic flux return that is opposite the first edge and the magnetic sensor,
wherein the permanent magnet has a first pole facing the magneto-elastic layer and a second pole facing the magnetic flux return.

21. A force sensor comprising:
a magnetic field generator;
a magnetic flux return extending along a first portion of at least one pathway of magnetic flux generated by the magnetic field generator;
a magneto-elastic layer operable to be in contact with a surface of a combustion engine valve assembly subjected to force and thereby strained, the magneto-elastic layer extending along a second portion of the at least one pathway of magnetic flux distinct from the first portion;
a bobbin disposed at least partially about the magnetic flux return; and
a passive coil disposed about the bobbin and along the pathway of the magnetic flux;
wherein the magnetic field generator is further defined as a permanent magnet extending between opposed first and second sides of the magnetic flux return, the permanent magnet having a first pole facing the first side of the magnetic flux return and a second pole facing the second side of the magnetic flux return,
wherein the permanent magnet is disposed between the magneto-elastic layer and the passive coil, and
wherein an air gap is defined between the first and second sides of the magnetic flux return and between opposed portions of the bobbin.

22. A force sensor comprising:
a magnetic field generator;
a magnetic flux return extending along a first portion of at least one pathway of magnetic flux generated by the magnetic field generator;
a magneto-elastic layer operable to be in contact with a surface of a combustion engine valve assembly subjected to force and thereby strained, the magneto-elastic layer extending along a second portion of the at least one pathway of magnetic flux distinct from the first portion; and
a magnetic sensor disposed in a balancing air gap defined between opposed first and second sides of the magnetic flux return,
wherein the magnetic field generator is further defined as a permanent magnet extending between opposed first and second sides of the magnetic flux return, the permanent magnet having a first pole facing the first side of the magnetic flux return and a second pole facing the second side of the magnetic flux return, and
wherein the permanent magnet is disposed between the magneto-elastic layer and the magnetic sensor.

* * * * *